United States Patent
Gao et al.

(10) Patent No.: US 8,498,653 B2
(45) Date of Patent: Jul. 30, 2013

(54) LOAD SHARING METHOD, DEVICE, AND SYSTEM

(75) Inventors: Lingling Gao, Chengdu (CN); Jianbo Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/278,776

(22) Filed: Oct. 21, 2011

(65) Prior Publication Data

US 2012/0040684 A1 Feb. 16, 2012

(30) Foreign Application Priority Data

Apr. 23, 2009 (CN) .......................... 2009 1 0082554

(51) Int. Cl.
*H04W 28/08* (2009.01)

(52) U.S. Cl.
USPC ......................................................... 455/453

(58) Field of Classification Search
USPC ..... 455/453, 450, 456.1–456.6, 435.1–435.2, 455/422.1, 406, 436; 370/331, 338
See application file for complete search history.

(56) References Cited

U.S. PATENT DOCUMENTS

| | | | |
|---|---|---|---|
| 7,937,110 B2 | 5/2011 | Wu et al. | |
| 2006/0142021 A1* | 6/2006 | Mueckenheim et al. | 455/453 |
| 2006/0285523 A1 | 12/2006 | Ishii et al. | |
| 2006/0293060 A1* | 12/2006 | Yang et al. | 455/453 |
| 2007/0280159 A1 | 12/2007 | Liu | |
| 2008/0069088 A1 | 3/2008 | Petrovic et al. | |
| 2008/0119198 A1 | 5/2008 | Hettstedt et al. | |
| 2008/0318589 A1* | 12/2008 | Liu et al. | 455/453 |
| 2009/0318161 A1* | 12/2009 | Lopes | 455/453 |
| 2010/0113060 A1* | 5/2010 | Bai et al. | 455/453 |
| 2010/0144365 A1* | 6/2010 | Pan et al. | 455/453 |
| 2011/0158332 A1 | 6/2011 | Wu et al. | |

FOREIGN PATENT DOCUMENTS

| | | |
|---|---|---|
| CN | 1466274 A | 1/2004 |
| CN | 101312594 A | 11/2008 |
| CN | 100452898 A | 1/2009 |
| CN | 101541041 A | 9/2009 |
| EP | 1 592 275 A1 | 11/2005 |
| EP | 1 713 290 A1 | 10/2006 |
| WO | WO 2005/086509 A1 | 9/2005 |
| WO | WO 2005/086510 A1 | 9/2005 |
| WO | 2008041929 A2 | 4/2008 |
| WO | WO 2008/061701 A1 | 5/2008 |

OTHER PUBLICATIONS

International Search Report, PCT/CN2010/072095, dated Jul. 22, 2010, 3 pages.
Written Opinion of the International Searching Authority, PCT/CN2010/072095, dated Jul. 22, 2010, 5 pages.
Extended European Search Report, Application No./Patent No. 10766650.5-2412 / PCT/CN2010/072095, dated Dec. 20, 2011, 7 pages.
Search report issued in corresponding EP application No. 12180287.0, Jan. 7, 2013, total 7 pages.

(Continued)

*Primary Examiner* — Melody Mehrpour (57) ABSTRACT

A load sharing method, device, and system are provided in the disclosure. The method includes obtaining a current load value. If the current load value exceeds a preset load threshold value, a sharing base station is selected. Information of a shared load that needs to be shared is transmitted to the selected sharing base station.

19 Claims, 4 Drawing Sheets

OTHER PUBLICATIONS

Office action issued in corresponding Chinese application No. 201080017926.1, dated Mar. 5, 2013, and an English translation thereof, total 20 pages.

Search report issued in corresponding Chinese application No. 201080017926.1, dated Feb. 28, 2013, total 2 pages.

* cited by examiner

LOAD SHARING METHOD, DEVICE, AND SYSTEM

This application is a continuation of International Application No. PCT/CN2010/072095, filed on Apr. 23, 2010, which claims priority to Chinese Patent Application No. 200910082554.X, filed on Apr. 23, 2009, both of which are hereby incorporated by reference in their entireties.

TECHNICAL FIELD

The present invention relates to the field of communication technologies, and in particular, to a load sharing method, device and system.

BACKGROUND

Evolved universal mobile telecommunication system (universal mobile telecommunication system, UMTS for short) territorial radio Access network (evolved universal mobile telecommunication system territorial radio access network, E-UTRAN for short) and evolved packet core (evolved packet core, EPC for short) to form evolved packet system (evolved packet system, EPS for short). The E-UTRAN includes a base stationbase station. On the EPS with flat system architecture, the load status between base stations can be communicated by exchanging signaling through interconnected X2 interfaces. Each base station serves a separate cell. Each base station is connected to mobility management entity (mobility management entity, MME for short) in the EPC through S1 interface.

When implementing the present invention, the inventor finds at least the following defects of the existing technology: In the preceding system, in different time periods, the traffic volume of the cells served by each base station is different. An base station to which a cell with a light traffic volume belongs has a light load. An base station to which a cell with a heavy traffic volume belongs has a heavy load. As a result, the load on base stations is unshared, thereby lightering the usage rate of radio baseband resource.

SUMMARY OF THE INVENTION

A load sharing method, device and system are provided in embodiments of the present invention.

A load sharing method is provided in an embodiment of the present invention. The load sharing method includes:

obtaining a current load value;

if the current load value exceeds a preset load threshold value, interacting with middle base stations built in an MME of a requesting base station through load state signaling, and selecting a sharing base station;

transmitting information of a shared load that needs to be shared to the selected sharing base station; and sharing the shared load to the sharing base station according to baseband resource prepared based on information of the shared load.

Another load sharing method is provided in an embodiment of the present invention. The load sharing method includes:

when a current load value of a requesting base station exceeds a preset load threshold value, receiving information of a shared load that needs to be shared sent by the requesting base station; and preparing baseband resource based on the information of the shared load for the requesting base station to share the shared load to a sharing base station.

A load sharing device is provided in an embodiment of the present invention. The device includes:

a first obtaining unit, configured to obtain a current load value;

a selecting unit, configured to: if the current load value exceeds a preset load threshold value, interact with middle base stations built in an MME of a requesting base station through load state signaling, and select a sharing base station;

a processing unit, configured to transmit information of a shared load that needs to be shared to the selected sharing base station; and a sharing unit, configured to share the shared load to the sharing base station according to baseband resource prepared based on information of the shared load.

Another load sharing device is provided in an embodiment of the present invention. The device includes:

a second obtaining unit, configured to: when a current load value of a requesting base station exceeds a preset load threshold value, receive information of a shared load that needs to be shared sent by the requesting base station; and a preparing unit, configured to prepare baseband resource based on the information of the shared load for the requesting base station to share the shared load to a sharing base station.

A load sharing system is provided in an embodiment of the present invention. The system includes a requesting base station and a sharing base station, wherein:

the requesting base station is configured to: obtain a current load value; if the current load value exceeds a preset load threshold value, interact with middle base stations built in an MME of the requesting base station through load state signaling, and select the sharing base station; transmit information of a shared load that needs to be shared to the selected sharing base station; and share the shared load to the sharing base station according to baseband resource prepared based on information of the shared load; and the sharing base station is configured to obtain the information of the shared load that needs to be shared sent by the requesting base station and prepare baseband resource based on the information of the shared load.

It can be understood from the preceding technical scheme that when the requesting base station in the embodiment of the present invention detects an excessively heavy load, a sharing base station is selected from the middle base stations configured in the same MME to share the load to be shared. A terminal that shares services can use the radio frequency resource of a heavy-load base station, that is, the requesting base station, and uses the baseband resource of other light-load base station, that is, the sharing base station, thereby balancing the load among base stations, improving the usage rate of radio baseband resource, fully using different devices of the operator, and saving the cost.

BRIEF DESCRIPTION OF THE DRAWINGS

To better illustrate technical solutions in embodiments of the present invention or in the prior art, the drawings that need to be used in embodiments of the present invention or the description of existing technologies are introduced briefly. Obviously, the drawings merely reflect some embodiments of the present invention. Those skilled in the art can obtain other drawings based on these drawings without innovative work.

DETAILED DESCRIPTION OF ILLUSTRATIVE EMBODIMENTS

The technical solution under the present invention is elaborated below with reference to the accompanying drawings. Evidently, the embodiments described below are for the exemplary purpose only, without covering all embodiments of the present invention. All the other embodiments obtained by those skilled in the art without creative work based on the embodiments of the present invention are protected by the present invention.

Figure 1:
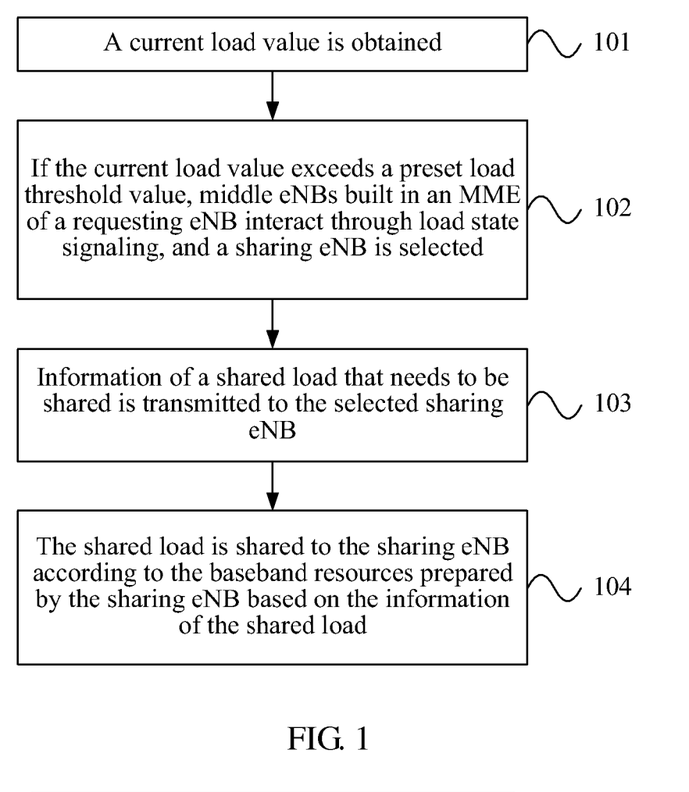
FIG. 1 shows a process of a load sharing method provided in a first embodiment of the present invention.

FIG. 1 shows a process of a load sharing method provided in a first embodiment of the present invention. The load sharing method in this embodiment may include:

Step 101: obtaining a current load value.

Step 102: if the current load value exceeds a preset load threshold value, interacting with middle base stations built in an MME of a requesting base station through load state signaling, and selecting a sharing base station.

Step 103: transmitting information of a shared load that needs to be shared to the selected sharing base station.

Step 104: sharing the shared load to the sharing base station according to baseband resource prepared based on the information of the shared load.

The load threshold value in this embodiment is the load threshold value for the requesting base station to ensure quality of service (quality of service, QoS for short) for UE. If the current load value is smaller than this load threshold value, the requesting base station can ensure the QoS for an accessed UE. If the current load value is greater than this load threshold value, the requesting base station cannot ensure the QoS for an accessed UE.

The load sharing method provided in this embodiment of the present invention may use two modes for sharing the services of UE. In one mode, the requesting base station shares all services of one or more UEs to the sharing base station. In another mode, the requesting base station shares some services of one or more UEs to the sharing base station. For the first mode, the information of the shared load in this embodiment may include UE information such as the context information of the UE for load sharing and ID (eg: AP ID) of the UE in the MME. For the second mode, the information of the shared load in this embodiment further includes service information such as service ID in load sharing.

In this embodiment, the overloaded requesting base station can share the load to be shared to one or more sharing base stations configured in the homing MME so that UEs can use the radio resource of the heavy-load base station and use the baseband resource of other light-load base stations to ensure the QoS, thereby properly using baseband resource sharing of light-load base stations, balancing the base station load, and improving the usage rate of radio baseband resource.

Figure 2:
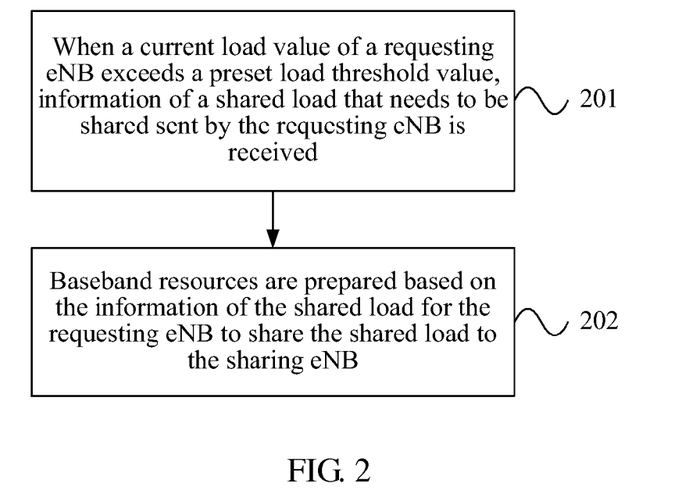
FIG. 2 shows a process of a load sharing method provided in a second embodiment of the present invention.

FIG. 2 shows a process of a load sharing method in a second embodiment of the present invention. The load sharing method in this embodiment may include:

Step 201: when a current load value of a requesting base station exceeds a preset load threshold value, receiving information of a shared load that needs sent by a requesting base station; and Step 202: preparing baseband resource based on the information of the shared load for the requesting base station to share the shared load to a sharing base station.

The load sharing method provided in this embodiment of the present invention may use two modes for sharing the services of UE. In one mode, the requesting base station shares all services of one or more UEs to the sharing base station. In another mode, the requesting base station shares some services of one or more UEs to the sharing base station. For the first mode, the information of the shared load in this embodiment may include UE information such as the context information of the UE for load sharing and ID (eg: AP ID) of the UE in the MME. For the second mode, the information of the shared load in this embodiment further includes service information such as service ID in load sharing. The sharing base station can prepare relevant baseband resource for the corresponding shared load between base station and MME based on the information of the shared load, and use the relevant baseband resource for the corresponding shared load to receive load-sharing data from the EPC. In this manner, after relevant processing of the load-sharing data, the requesting base station can deliver the load-sharing data to relevant UEs. As a result, the requesting base station with an excessively heavy load currently can share the load to the sharing base station with a light load.

In this embodiment, the overloaded requesting base station can share the load to be shared to one sharing base station configured in the homing MME so that UEs can use radio resource of the heavy-load base station and use the baseband resource of other light-load base stations to ensure the QoS, thereby properly using baseband resource sharing of light-load base stations, balancing the base station load, and improving the usage rate of radio baseband resource.

Figure 3:
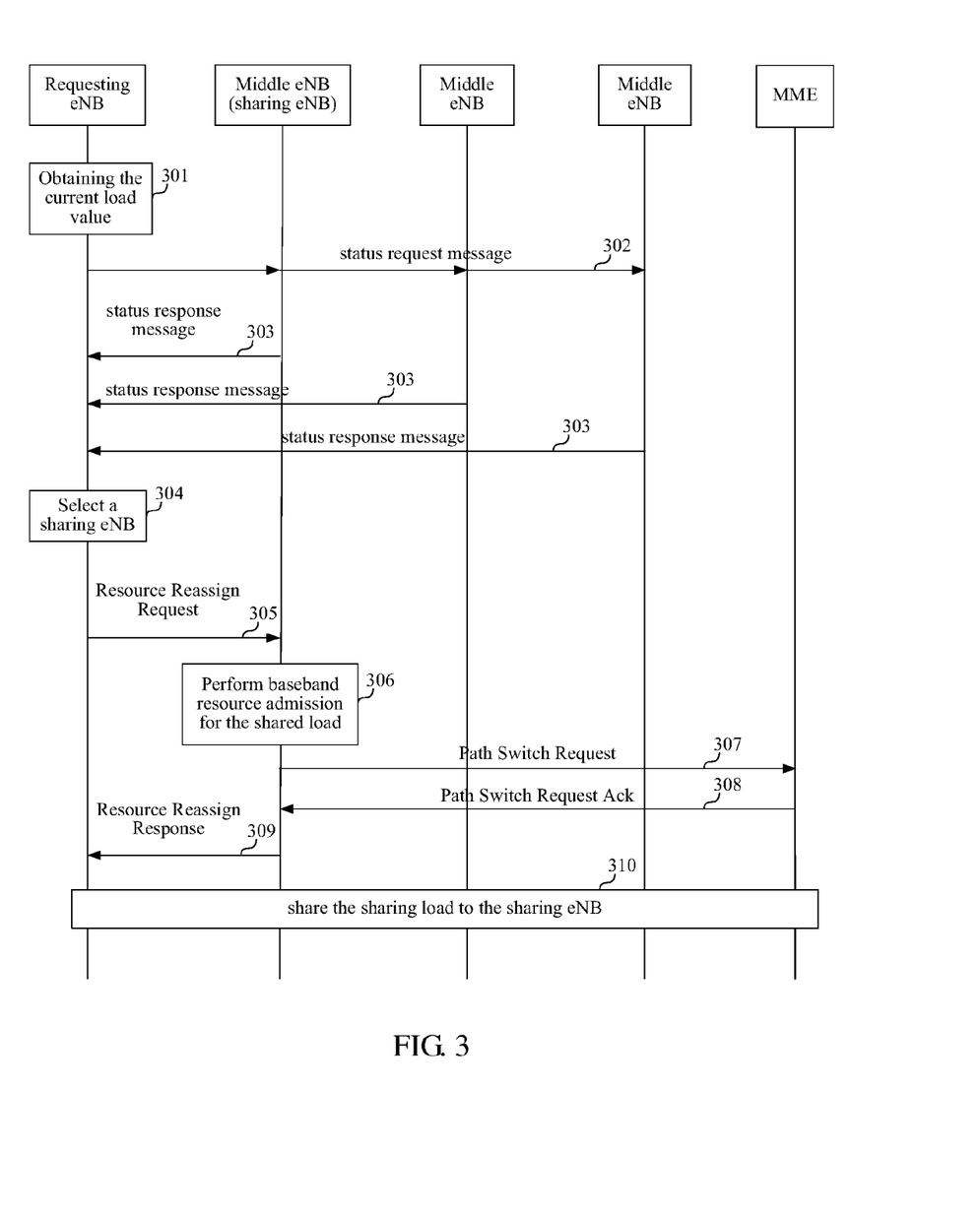
FIG. 3 shows a process of a load sharing method provided in a third embodiment of the present invention.

FIG. 3 shows a process of a load sharing method in a third embodiment of the present invention. The load sharing method in this embodiment may include:

Step 301: obtaining, by a requesting base station, a current load value of the requesting base station.

Step 302: if the current load value of the requesting base station is greater than a preset load threshold value, sending, by the requesting base station, a resource status request message (resource status request) to all middle base stations configured in a homing MME of the requesting base station, wherein the resource status request message carries a shared load value that specifies the load to be shared.

In this embodiment, all middle base stations in a same MME that can be interconnected through the X2 interface can be configured into an base station pool (base station pool), and a relevant base station pool ID (base station pool ID) is allocated to this base station pool. The middle base stations in the base station pool are independent. The configuration of the base station pool is simple. The subsequent networking mode is flexible, and capacity expansion is convenient.

Different policies may be used to determine the shared load value. For example, the excessive load value may be defined as the expected shared load value. Relevant information, such as service type and service quality, of the current service may be used to define the shared load value. The shared load value determined through the preceding policies defines the load to be shared.

Further, this resource status request message may contain relevant information of the base station pool, for example, base station pool ID, relevant information of the operator to which the relevant middle base station belongs, for example, operator ID, and relevant service information, for example, service license ID. Table 1 lists the IEs contained in the resource status request message.

TABLE 1

IEs contained in the resource status request message

| IE Name | Mandatory or Not | Status in the Protocol |
|---|---|---|
| Message Type | Mandatory (M) | Existing |
| Registration Request | Mandatory (M) | Existing |
| Cell To Report List | | Existing |
| >Cell ID | Mandatory (M) | Existing |
| Reporting Periodicity | Optional (O) | Existing |
| Load To Report List | Mandatory (M) | Newly added |
| >eNodeB Pool ID | Mandatory (M) | Newly added |
| >Load Threshold | Mandatory (M) | Newly added |
| >Operator ID | Mandatory (M) | Newly added |

Compared with the current signaling, the resource status request message in this step adds the load to report list IE. This IE is mandatory in the step in this embodiment of the present invention. The cell to report and reporting periodicity IEs are optional. The load threshold IE is the shared load expected by the requesting base station for other middle base stations in the same base station pool to share.

Step 303: receiving, by the middle base stations configured in the MME, the resource status request message, and returning a resource status response message to the requesting base station based on the value of load threshold and the current load value of each middle base station, where the resource status response message carries a load information IE that specifies the current load information corresponding to the middle base station.

After receiving the resource status request message, the middle base station in the homing MME of the requesting base station can determine value of the load of the requesting base station that can be shared by the middle base station based on the obtained current load value, and compare the determined value with the value of the load that needs to be shared contained in the resource status request message. If the value of the load that can be shared is greater than the value of the load that needs to be shared, the middle base station returns a resource status response message to the requesting base station. Further, each middle base station can determine the value of the load that it can share based on service license (license) it can provide. Accordingly, the resource status response message may contain license ability (license ability). Table 2 lists the IEs contained in the resource status response message.

TABLE 2

IEs contained in the resource status response message

| IE Name | Mandatory or Not | Status in the Protocol |
|---|---|---|
| Message Type | Mandatory (M) | Existing |
| Criticality Diagnostics | Mandatory (M) | Existing |
| Load Report List | Mandatory (M) | Newly added |
| Operator ID | Mandatory (M) | Newly added |
| Licenses Ability | Mandatory (M) | Newly added |
| Load Information | Mandatory (M) | Newly added |

Compared with the existing signaling, the resource status response message in this step adds the load to report list IE, which is mandatory in this step.

Step 304: receiving, by the requesting base station, resource status response messages from one or more middle base stations, and selecting a proper middle base station as a sharing base station according to the current load value of the middle base station and the license type in the resource status response messages, for example, selecting the middle base station with the smallest current load value as the sharing base station.

Step 305: sending, by the requesting base station, a resource reassign request message (resource reassign request) to the selected sharing base station, where the resource reassign request message carries information of the load to be shared, for the sharing base station to prepare baseband resource corresponding to the load to be shared.

The load sharing method provided in this embodiment of the present invention may use two modes for sharing the services of UE. In one mode, the requesting base station shares all services of one or more UEs to the sharing base station. In another mode, the requesting base station shares some services of one or more UEs to the sharing base station. For the first mode, the information of the shared load in this embodiment may include UE information such as the context information of the UE for load sharing and ID (AP ID) of the UE in the MME. For the second mode, the information of the shared load in this embodiment further includes service information such as the service ID in load sharing.

Step 306: receiving, by the sharing base station, the resource reassign request message, and performing baseband resource admission for the shared load requested in the resource reassign request message.

Step 307: after baseband resource admission succeeds, sending, by the sharing base station, a path switch request (path switch request) message for establishing user plane data for relevant user load, where the message carries information of the load to be shared to request for sharing the relevant load.

Step 308: after receiving the path switch request message and interacting with a service gateway (S-GW) to obtain a response from the S-GW, sending, by the MME, a path switch request ack (path switch request ack) message to the sharing base station to complete interaction between the sharing base station and the MME at the signaling plane and data plane.

Step 309: receiving, by the sharing base station, the path switch request ack message, and returns a resource reassign response (resource reassign response) message to the requesting base station.

For details about the Resource Reassign Request message in step 305, reference may be made to handover request (handover request) message in the 3GPP 36.323×2AP protocol. For details about the Resource Reassign Response message in step 309, reference may be made to handover request ack (handover request ack) message in the 3GPP 36.323×2AP protocol.

After receiving the Resource Reassign Response message, the requesting base station releases the baseband resource related to the shared UE. By far, the requesting base station receives the resource reassign response message and confirms that load sharing is implemented at the signaling layer.

Step 310: interacting, by the sharing base station, with the MME and the requesting base station, and the requesting base station shares the load to be shared to the sharing base station.

By far, the downlink data delivered by the core network to the UE that shares the load is transmitted to the sharing base station. The sharing base station transmits the data to the UE by using remote radio unit (remote radio unit, RRU for short) of the requesting base station through the CPRI interface between the sharing base station and the requesting base station. The uplink data is transmitted in the opposite direction.

In this embodiment of the present invention, the load state between base stations is known through interaction of the load state signaling at the X2 interfaces of the base stations. When the load of a certain base station is unshared, a light-load base station sends a load sharing request to switch the load service of the UE from one base station to another base station, thereby balancing the load between base stations. Signaling interaction between base stations is implemented by adding relevant IEs to existing signaling and using the path switch signaling group interacted with the core network during switching.

In this embodiment, the requesting base station and middle base stations (including the sharing base station) are neighboring and belong to the same MME, but serve different cells. In different time periods, the traffic volume of a cell served by an base station is different. For example, the cell served by the requesting base station is in the city center, where the traffic volume at daytime is heavy. As a result, the load of the requesting base station is heavy. The cell served by a middle base station is in the residence area, where the traffic volume at daytime is light. As a result, the load of the middle base station is light. In this case, the usage of resource among base stations is unshared. The method provided in this embodiment can share the load by scheduling neighboring sharing base stations whose load is light when the requesting base station has a heavy load. In this embodiment, when the load of the requesting base station is heavy, a sharing base station can be selected through interaction of the load state signaling with the middle base stations configured in the same MME. The sharing base station interacts with the MME in the EPC. The relevant baseband resource of the shared load between the sharing base station and the MME are used to receive the load-sharing data delivered by the EPC. After relevant processing on the load-sharing data, the sharing base station interacts with the requesting base station, and delivers the load-sharing data through the requesting base station to the relevant UE. In this case, some services, that is, the shared load, of the requesting base station currently with a heavy load can be processed by the sharing base station with a light load, thereby implementing switching of services between base stations.

When the UE does not meet the switching conditions, the base stations interact signaling through the X2 interface to share the load among base stations in flexible modes. The shared load can be switched dynamically between base stations, thereby properly using the baseband resource of the base station. The UE whose load is shared uses the radio frequency resource of the homing base station of the accessed cell, that is, the requesting base station, and the baseband resource of the sharing base station, thereby balancing the load between the requesting base station and the destination base station, reducing the load of the requesting base station, improving the usage rate of radio baseband resource, and ensuring the QoS for the UE.

In this embodiment, the X2 interface is used to interact signaling for load query and load sharing on the EPS network, and the CPRI interface between base stations may be used to transmit load data. In this case, in the base station pool configured in the MME, the requesting base station with a heavy load can share the load to be shared to a sharing base station configured in the same MME, enabling the UE to use the radio frequency resource of a heavy-load base station and baseband resource of other light-load base stations, thereby implementing baseband resource sharing among base stations, balancing the load among base stations, and improving the usage rate of radio baseband resource.

Figure 4:
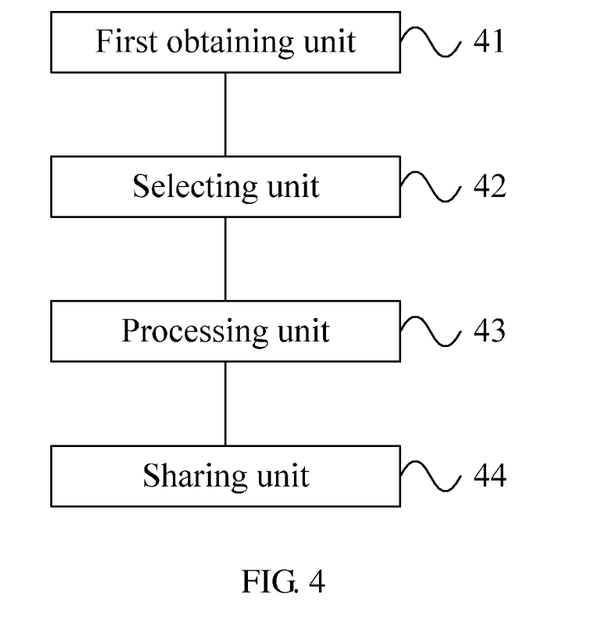
FIG. 4 shows a structure of a load sharing device provided in a fourth embodiment of the present invention.

FIG. 4 shows a structure of a load sharing device provided in a fourth embodiment of the present invention. The load sharing device in this embodiment may include a first obtaining unit 41, a selecting unit 42, a processing unit 43, and a sharing unit 44. The first obtaining unit 41 obtains a current load value. If the current load value exceeds a preset load threshold value, the selecting unit 42 interacts through load state signaling with middle base stations configured in an MME to which the requesting base station belongs, and selects a sharing base station. The processing unit 43 transmits information of a shared load that needs to be shared to the selected sharing base station. The sharing unit 44 shares the shared load to the sharing base station according to the baseband resource prepared by the sharing base station based on the information of the shared load.

The method in the first embodiment of the present invention and the function of the requesting base station in the third embodiment may be implemented by the load-sharing device provided in the fourth embodiment of the present invention.

The sharing unit in the load sharing device provided in this embodiment of the present invention may use two modes for sharing the services of UE. In one mode, the sharing unit shares all services of one or more UEs to the sharing base station. In another mode, the sharing unit shares some services of one or more UEs to the sharing base station. For the first mode, the information of the shared load in this embodiment may include UE information such as the context information of the UE for load sharing and ID (AP ID) of the UE in the MME. For the second mode, the information of the shared load in this embodiment further includes service information such as the service ID in load sharing.

In this embodiment, the overloaded requesting base station can share the load to be shared to one sharing base station configured in the homing MME so that UEs can use the radio resource of the heavy-load base station and use the baseband resource of other light-load base stations, thereby properly using baseband resource sharing of light-load base stations, balancing the base station load, and improving the usage rate of radio baseband resource.

Figure 5:
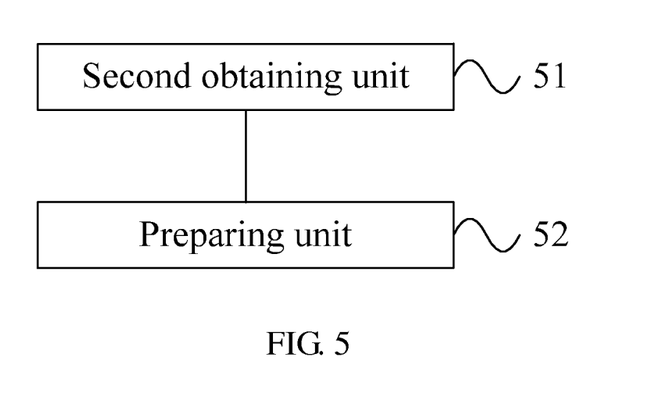
FIG. 5 shows a structure of a load sharing device provided in a fifth embodiment of the present invention.

FIG. 5 shows a structure of a load sharing device provided in a fifth embodiment of the present invention. The load sharing device in this embodiment may include a second obtaining unit 51 and a preparing unit 52. When the current load value of a requesting base station exceeds a preset load threshold value, the second obtaining unit 51 receives information of a shared load to be shared sent by the requesting base station, and the preparing unit 52 prepares baseband resource based on the information of the shared load for the requesting base station to share the shared load to a sharing base station.

The method in the second embodiment of the present invention and the function of the sharing base station in the third embodiment may be implemented by the load-sharing device provided in the fifth embodiment of the present invention.

The preparing unit in the load sharing device provided in this embodiment of the present invention can prepare relevant baseband resource for the corresponding shared load between base station and MME based on the information of the shared load, and use the relevant baseband resource for the corresponding shared load to receive load-sharing data from the EPC. In this manner, after relevant processing of the load-sharing data, the requesting base station can deliver the load-sharing data to relevant UEs. As a result, the requesting base station with an excessively heavy load currently can share the load to the sharing base station with a light load.

In this embodiment, the overloaded requesting base station can share the load to be shared to one sharing base station configured in the homing MME so that UEs can use the radio resource of the heavy-load base station and use the baseband resource of other light-load base stations, thereby properly using baseband resource sharing of light-load base stations, balancing the base station load, and improving the usage rate of radio baseband resource.

Figure 6:
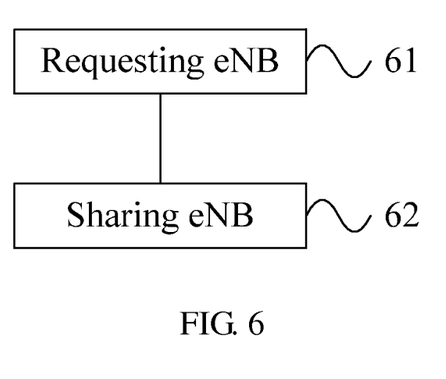
FIG. 6 shows a structure of a load sharing system provided in a sixth embodiment of the present invention.

FIG. 6 shows a structure of a load sharing system provided in a sixth embodiment of the present invention. The load sharing system provided in this embodiment may include a requesting base station 61 and a sharing base station 62, where:

the requesting base station 61 is configured to: obtain a current load value; if the current load value exceeds a preset load threshold value, interact with middle base stations built in an MME of the requesting base station 61 through load state signaling, and select the sharing base station 62; transmit information of a shared load that needs to be shared to the selected sharing base station 62; and share the shared load to the sharing base station 62 according to baseband resource prepared based on information of the shared load; and the sharing base station 62 is configured to obtain information of the shared load that needs to be shared sent by the requesting base station 61 and prepare baseband resource based on the information of the shared load.

The requesting base station 61 in this embodiment may be a load sharing device provided in the fourth embodiment of the present invention. The sharing base station 62 in this embodiment may be a load sharing device provided in the fifth embodiment of the present invention.

It can be understood by those skilled in the art that all or some steps in the preceding embodiments of the present invention can be performed by instructing related hardware through a program. The program can be stored in a storage medium that can be read by a computer. When being executed, the program performs the steps in the preceding embodiments of the present invention. The storage medium may be ROM, RAM, disk, or CD that can store program codes.

The preceding embodiments are intended to describe the technical scheme revealed in the present invention but not to confine the invention. It is understandable to those skilled in the art that modifications or equivalent replacements can be made on the technical scheme provided in embodiments of the present invention without departing from the spirit and scope of the technical scheme provided in the present invention.

What is claimed is:

1. A method comprising:
    obtaining, by a first base station, a current load of the first base station, including load created by a user equipment (UE) in a first cell served by the first base station, the first base station being connected to a mobility management entity (MME);
    selecting, by the first base station, a second base station also connected to the MME when the current load of the first base station exceeds a preset load threshold; and
    transmitting, by the first base station, information of a load to be shared to the second base station, for the load to be shared with the second base station without switching the UE to another cell served by the second base station, wherein the information of the load to be shared includes information of at least some of the current load of the first base station.

2. The method according to claim 1, wherein the selecting comprises:
    sending, by the first base station, a resource status request message indicating the load to be shared to a plurality of base stations also connected to the MME, when the current load of the first base station exceeds the preset load threshold;
    receiving, by the first base station, a resource status response message indicating current load of one base station in the plurality of base stations;
    determining, by the first base station, whether the one base station can accept all or a portion of the load to be shared in addition to the current load of the one base station; and
    selecting, by the first base station, the one base station as the second base station if the one base station can accept all or a portion of the load to be shared.

3. The method according to claim 1, wherein the selecting comprises:
    sending, by the first base station, a resource status request message indicating the load to be shared to a plurality of base stations also connected to the MME, when the current load of the first base station exceeds the preset load threshold;
    receiving, by the first base station, a plurality of resource status response messages from the plurality of base stations, each resource status response message indicating current load of its respective base station in the plurality of base stations; and
    selecting, by the first base station, as the second base station one of the plurality of base stations with the lowest current load among the plurality of base stations.

4. The method according to claim 2, wherein the resource status request message carries at least one or any combination of the following: base station pool ID, operator ID, and service license ID.

5. The method according to claim 1, wherein the transmitting comprises transmitting a resource reassign request message carrying the information of the load to be shared to the second base station.

6. The method according to claim 1, wherein the information of the load to be shared comprises at least one of: context information of the UE, and a UE ID in the MME.

7. The method according to claim 1, wherein the information of the load to be shared comprises a service ID of the load to be shared.

8. The method according to claim 1, wherein the load to be shared comprises the residual of the current load of the first base station exceeding the preset load threshold.

9. The method according to claim 1, wherein the current load of the first base station comprises a service of the UE.

10. A method comprising:
    receiving from a first base station, by a second base station, information of a load to be shared by the first base station, for the load to be shared with the second base station without switching a user equipment (UE) in a first cell served by the first base station to another cell served by the second base station, when a current load of the first base station exceeds a preset load threshold, the current load including a load created by the UE; and
    preparing, by the second base station, a baseband resource in accordance with the information of the load to be shared to share the load with the first base station.

11. The method according to claim 10, wherein the receiving comprises:
    receiving a resource reassign request message carrying the information of the load to be shared sent by the first base station.

12. The method according to claim 11, wherein the preparing comprises:
    performing baseband resource admission for the load to be shared in the resource reassign request message; and
    transmitting a path switch request message carrying the information of the load to be shared to the MME.

13. The method according to claim 10, wherein the information of the load to be shared comprises at least one of: context information of the UE, and a UE ID in the MME.

14. The method according to claim 10, further comprising:
receiving, by the second base station, a resource status request message carrying the load to be shared sent by the first base station, wherein the resource status request message carries at least one or any combination of the following: a base station pool ID, an operator ID, and a service license ID.

15. A first base station connected with a mobility management entity (MME) comprising:
a processor configured to select a second base station also connected to the MME when a current load of the first base station exceeds a preset load threshold; and
a transmittor configured to transmit information of a load to be shared to the second base station, for the load to be shared with the second base station without switching a user equipment (UE) from a first cell served by the first base station to another cell served by the second base station, the current load of the first base station including a load created by the UE.

16. A base station connected to a mobility management entity (MME) comprising:
a receiver configured to receive from another base station also connected to the MME, information of a load to be shared from the other base station, for the load to be shared with the base station without switching a user equipment (UE) from a cell served by the other base station to a cell served by the base station, the current load of the other base station including a load created by the UE; and
a processor configured to prepare baseband resource in accordance with the information of the load to be shared, to enable the other base station to share the load with the base station connected to the MME.

17. A system comprising:
a first base station connected to a mobility management entity (MME), the first base station serving a first cell; and
a second base station also connected to the MME, the second base station serving a second cell,
wherein the first base station is configured to:
select the second base station to share a load with the first base station without switching a user equipment (UE) from the first cell to the second cell, when a current load of the first base station exceeds a preset load threshold; and
transmit information of the load to be shared to the second base station, the current load of the first base station including a load created by the UE; and
wherein the second base station is configured to:
receive information of the load to be shared sent by the first base station; and
prepare a baseband resource based on the information of the load to be shared to share the load for the first base station.

18. The system according to claim 17, wherein the load to be shared is configured to be determined by the first base station in accordance with a current service of the first base station.

19. A method comprising:
obtaining, by a first base station, a current load of the first base station, including load created by a user equipment (UE) in a first cell served by the first base station, the first base station being connected to a mobility management entity (MME);
selecting, by the first base station, a second base station also connected to the MME when the current load of the first base station exceeds a preset load threshold; and
transmitting, by the first base station, information of a load to be shared to the second base station, for the load to be shared with the second base station without switching the UE to another cell served by the second base station,
wherein the information of the load to be shared includes information of at least some of the current load of the first base station at least one of: context information of the UE, and a UE ID of the UE in the MME.

* * * * *